United States Patent
Johnson (10) Patent No.: US 7,925,270 B1
(45) Date of Patent: Apr. 12, 2011

(54) ANTENNA-TO-BASE STATION SELECTION SYSTEM

(75) Inventor: Harold Wayne Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1118 days.

(21) Appl. No.: 11/624,891

(22) Filed: Jan. 19, 2007

(51) Int. Cl.
  *H04W 72/00* (2009.01)
  *H04W 4/00* (2009.01)
  *H04M 1/00* (2006.01)
  *H04B 7/212* (2006.01)

(52) U.S. Cl. ............... 455/452.1; 455/562.1; 370/341; 370/448

(58) Field of Classification Search .......... 455/450, 455/451, 452.1, 452.2, 453, 561, 562.1, 63.1, 455/63.4; 370/328, 329, 330, 341, 347, 348
See application file for complete search history.

(56) References Cited

U.S. PATENT DOCUMENTS

| | | | |
|---|---|---|---|
| 6,697,642 B1 * | 2/2004 | Thomas | 455/562.1 |
| 6,906,663 B2 * | 6/2005 | Johnston | 342/173 |
| 6,967,942 B2 * | 11/2005 | Smolinske et al. | 370/346 |
| 7,379,750 B2 * | 5/2008 | Jalali | 455/550.1 |
| 7,477,659 B1 * | 1/2009 | Nee et al. | 370/468 |
| 7,564,872 B1 * | 7/2009 | Chawla et al. | 370/468 |
| 2002/0036595 A1 * | 3/2002 | Chiang et al. | 343/876 |
| 2002/0164963 A1 * | 11/2002 | Tehrani et al. | 455/101 |
| 2005/0096091 A1 * | 5/2005 | Sharony | 455/562.1 |
| 2005/0119011 A1 * | 6/2005 | Sakamoto et al. | 455/456.3 |
| 2006/0046639 A1 * | 3/2006 | Walker et al. | 455/3.02 |
| 2006/0056454 A1 * | 3/2006 | Dispensa et al. | 370/468 |
| 2006/0223587 A1 * | 10/2006 | Fernandez-Corbaton et al. | 455/562.1 |
| 2006/0279431 A1 * | 12/2006 | Bakarania et al. | 340/870.02 |
| 2007/0021079 A1 * | 1/2007 | Lin | 455/127.1 |
| 2007/0117580 A1 * | 5/2007 | Fehr | 455/509 |
| 2007/0133428 A1 * | 6/2007 | Taylor et al. | 370/252 |
| 2008/0080552 A1 * | 4/2008 | Gates et al. | 370/468 |
| 2009/0016279 A1 * | 1/2009 | Beser | 370/329 |

* cited by examiner

*Primary Examiner* — George Eng
*Assistant Examiner* — Christopher M Brandt (57) ABSTRACT

A wireless communication system has a plurality of base stations. The wireless communication system maintains a data structure that indicates wireless communication capacity for the base stations by time. The wireless communication system processes a user location and the data structure to select base stations having capacity during selected timeframes. A user communication interface has antennas that exchange wireless communications with the selected base stations. The user communication interface selects the antennas to use for the wireless communications with the selected base stations.

20 Claims, 6 Drawing Sheets

ANTENNA-TO-BASE STATION SELECTION SYSTEM

BACKGROUND OF THE INVENTION

1. Field of the Invention

The invention is related to the field of communications, and in particular, to wireless communication systems that select base stations for antennas.

2. Description of the Prior Art

Wireless communication systems have base stations that exchange wireless communications with user antennas. The base stations have differing capacities over time for wireless communications. Some base stations are heavily loaded during the day and lightly loaded in the evening. Other base stations are lightly loaded during the day and heavily loaded in the evening. Some base stations are always heavily loaded, while other base stations are always lightly loaded.

The user antennas may be omni-directional or uni-directional. The omni-directional antennas are convenient because they do not need to be pointed at a base station, but they typically have a smaller range and attempt to communicate with the closest base station—even if it is overloaded. The uni-directional antennas have a greater range, but they must be pointed at a base station, so a base station must be selected for the uni-directional antenna. Because of their greater range, uni-directional antennas may have a choice of potential base stations to use.

Users often have an expectation of when they will use wireless communications the most. One user may use wireless communications for work during the day, while another user may use wireless communication for leisure in the evening. Unfortunately, there is not an effective system that selects the proper base stations for user antennas based on user timeframes and base station capacities over time.

SUMMARY OF THE INVENTION

Examples of the invention include wireless communication systems and methods of operation for wireless communication systems. Examples of the invention include processing systems and methods of operation for processing systems. Examples of the invention include communication interfaces and methods of operation for communication interfaces.

Some examples of the invention include a wireless communication system that has a plurality of base stations. The wireless communication system maintains a data structure that indicates wireless communication capacity for the base stations over time. The wireless communication system processes a user location and the data structure to select base stations having capacity during selected timeframes. A user communication interface has antennas that exchange wireless communications with the selected base stations. The user communication interface selects the antennas to use for the wireless communications with the selected base stations.

Some examples of the invention include a method of operating a wireless communication system having a plurality of base stations. The method comprises: maintaining a data structure that indicates wireless communication capacity for the base stations by time; receiving a location and a communication timeframe for a user; processing the location to select a set of the base stations that can exchange wireless communications with the location; processing the data structure and the communication timeframe to select one of the base stations from the set that has the wireless communication capacity during the communication timeframe; and providing a user communication interface to the user. The user communication interface has a first antenna and a second antenna. The first antenna exchanges the wireless communications with the wireless communication system, and the second antenna exchanges the wireless communications with the wireless communication system through the selected base station. The user communication interface selects between the first antenna and the second antenna for the exchange of the wireless communications.

In some examples of the invention, the first antenna comprises an omni-directional antenna and the second antenna comprises a uni-directional antenna.

In some examples of the invention, the method comprises configuring the second antenna to point at the selected base station.

In some examples of the invention, the user communication interface selects between the first antenna and the second antenna based on signal strength for the wireless communications.

In some examples of the invention, the user communication interface selects between the first antenna and the second antenna based on time of day for the wireless communications.

In some examples of the invention, the user communication interface initially uses the first antenna for the wireless communications and the user communication interface uses the second antenna for the wireless communications if degradation occurs with the wireless communications over the first antenna.

In some examples of the invention, the user communication interface initially uses the first antenna for the wireless communications and the user communication interface uses the second antenna for the wireless communications in response to a control signal from the wireless communication system.

In some examples of the invention, the communication timeframe is selected by the user.

In some examples of the invention, the communication timeframe includes a 7 P.M. to 10 P.M. time period and excludes a 9 A.M. to 4 P.M. time period.

In some examples of the invention, the communication timeframe includes weekends and excludes weekdays.

Some examples of the invention include a method of operating a wireless communication system having a plurality of base stations. The method comprises: maintaining a data structure that indicates wireless communication capacity for the base stations by time; receiving a location for a user; processing the location and the data structure to select a first one of the base stations having the wireless communication capacity during a first timeframe and to select a second one of the base stations having the wireless communication capacity during a second timeframe, wherein the first timeframe and the second timeframe are mutually exclusive; and providing a user communication interface to the user. The user communication interface has a first antenna and a second antenna. The first antenna exchanges the wireless communications with the first base station. The second antenna exchanges the wireless communications with the second base station. The user communication interface selects between the first antenna and the second antenna for the exchange of the wireless communications.

In some examples of the invention, the first antenna and the second antenna comprise uni-directional antennas.

In some examples of the invention, the method further comprises configuring the first antenna to point at the first base station and configuring the second antenna to point at the second base station.

In some examples of the invention, the user communication interface selects between the first antenna and the second antenna based on signal strength for the wireless communications.

In some examples of the invention, the user communication interface selects between the first antenna and the second antenna based on time of day for the wireless communications.

In some examples of the invention, the user communication interface initially uses the first antenna for the wireless communications and the user communication interface uses the second antenna for the wireless communications if degradation occurs with the wireless communications over the first antenna.

In some examples of the invention, the user communication interface initially uses the first antenna for the wireless communications and the user communication interface uses the second antenna for the wireless communications in response to a control signal from the first base station.

In some examples of the invention, the first timeframe includes a 9 A.M. to 4 P.M. time period and excludes a 7 P.M. to 10 P.M. time period and the second timeframe includes the 7 P.M. to 10 P.M. time period and excludes the 9 A.M. to 4 P.M. time period.

In some examples of the invention, the first timeframe includes weekdays and excludes weekends and the second timeframe includes the weekends and excludes the weekdays.

BRIEF DESCRIPTION OF THE DRAWINGS

The same reference number represents the same element on all drawings.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
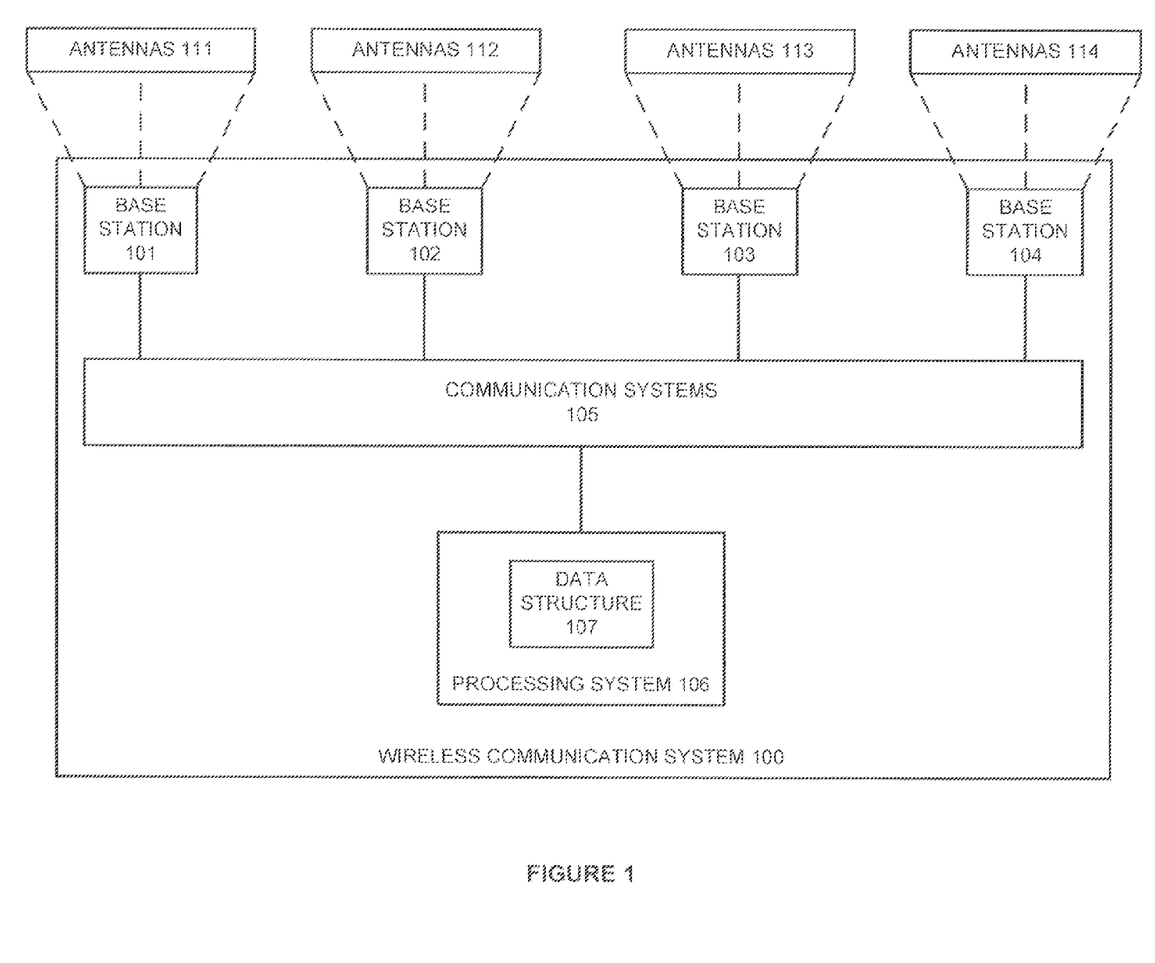
FIG. 1 illustrates a wireless communication system in an example of the invention.

FIG. 1 illustrates wireless communication system 100 in an example of the invention. Wireless communication system 100 includes base stations 101-104, communication systems 105, and processing system 106. Base stations 101-104 and antennas 111-114 exchange user communications in wireless communication signals. Antennas 111-114 serve user communication devices, such as telephones, televisions, computers, digital assistants, Internet appliances, game consoles, or some other communication devices. The wireless communication signals are transported over the air. The wireless communication signals use Code Division Multiple Access (CDMA), Global System for Mobile Communications (GSM), Wireless Fidelity (WIFI), Worldwide Interoperability Microwave Access (WIMAX), or some other wireless communication protocol.

Communication systems 105 include communication equipment, such as switches, routers, databases, call processors, servers, or some other type of network elements. Base stations 101-104 exchange the user communications with communication systems 105 over communication links. These communication links could use the air (wireless), metallic wires, optical fibers, or some other transport media. These communication links could use CDMA, WIMAX, Time Division Multiplex (TDM), Internet Protocol (IP), Ethernet, or some other communication protocol. Base stations 101-104 and communication systems 105 provide telephony, Internet access, media (video/audio) transfer, or some other communication service to the users.

Processing system 106 comprises a computer system that maintains data structure 107. Data structure 107 indicates the available communication capacity of base stations 101-104 in the time domain. Available capacity is a standard metric tracked by some base stations and is often indicated in percent, although other metrics could be used. Processing system 106 is coupled to communication systems 105 over a communication link, and communicates with base stations 101-104 over communication systems 105 and the communication links. Processing system 106 communicates with base stations 101-104 to determine the available communication capacity of base stations 101-104 in the time domain. For example, base station 101 may have 80% available capacity at night and 40% available capacity during the day.

Figure 2:
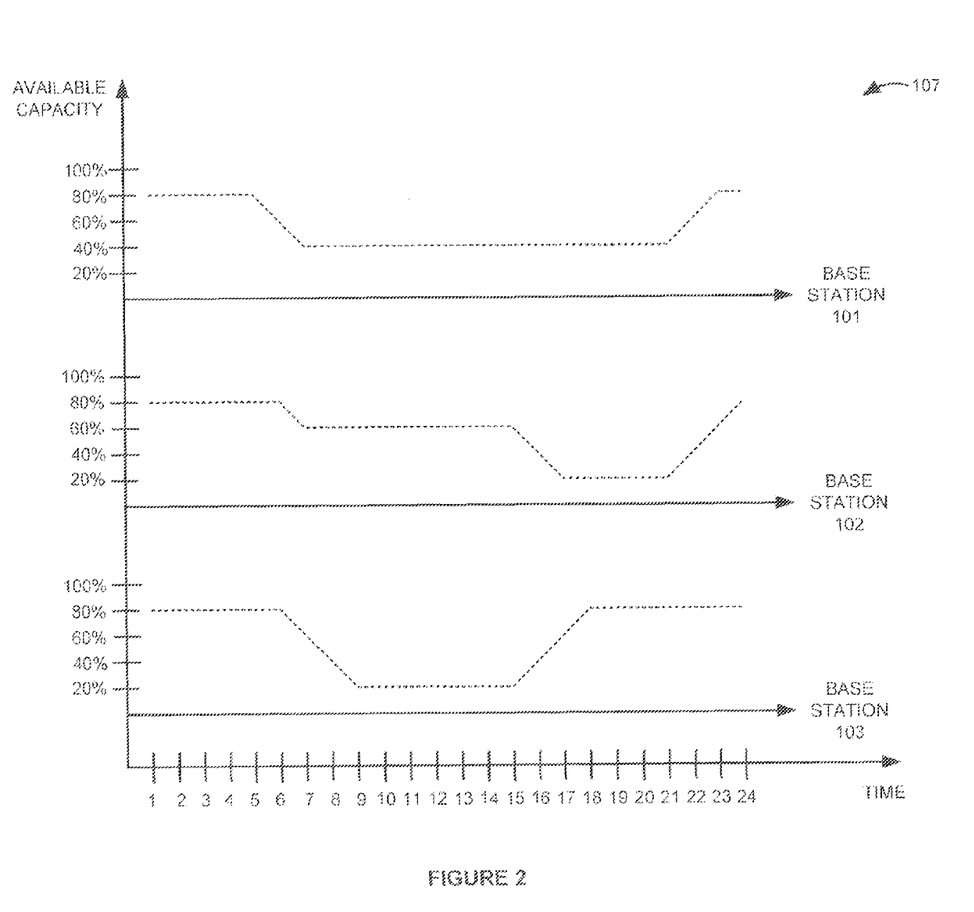
FIG. 2 illustrates a data structure in an example of the invention.

FIG. 2 illustrates data structure 107 in an example of the invention. Data structure 107 is illustrated as a graph for clarity, but data structure 107 could be maintained in tables, vectors, models, or some other data format that correlates available base station capacity to time. The horizontal axis indicates standard 24 hourly time increment. For clarity, only a single 24 hour day is illustrated, but capacity data would typically be maintained on an hourly basis for periods of a week, month, quarter, year or some other time increment. The vertical axis indicates available capacity for base stations 101-103 (capacity data for base station 104 is omitted for clarity). Base station 101 has 80% available capacity at night and 40% available capacity during the day and evening. Base station 102 has 80% available capacity at night, 60% available capacity during the day, and only 20% available capacity in the evening. Base station 103 has 80% available capacity at night, only 20% available capacity during the day, and 80% available capacity in the evening.

Available capacity indicates how busy a given base station is, and thus, how well the base station can handle additional user communications. For example, a base station with 20% available capacity is relatively busy, and a small usage spike could degrade service to base station users. In contrast, a base station with 60% available capacity is not that busy and could handle most usage spikes without any service degradation to base station users. Over time, the user is typically better off using a base station with more available capacity to avoid potential service degradation.

Figure 3:
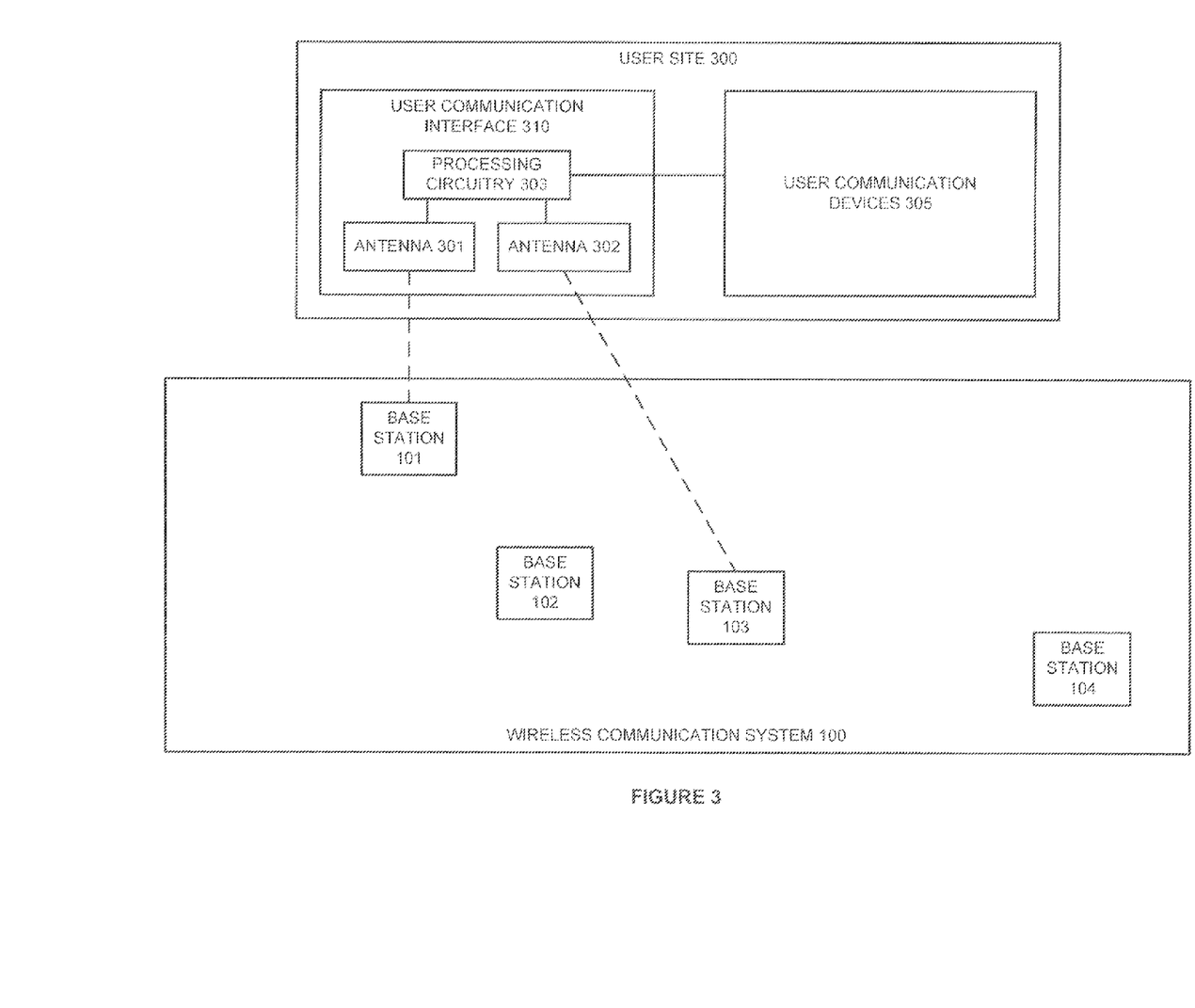
FIG. 3 illustrates the operation of a wireless communication system in an example of the invention.

FIG. 3 illustrates the operation of wireless communication system 100 in an example of the invention. For clarity, base stations 101-104 are shown on FIG. 3, but antennas 111-114 and systems 105-106 are omitted. FIG. 3 also shows user site 300. User site 300 includes user communication devices 305 and user communication interface 310. User communication devices 305 represent telephones, televisions, computers, digital assistants, Internet appliances, game consoles, or some other communication devices. Wireless communication system 100 and user communication interface 310 provide telephony, Internet access, media transfer, or some other communication service to user communication devices 305.

User communication interface 310 includes antennas 301-302 and processing circuitry 303. Processing circuitry 303 could be a modem, transceiver, radio, network card, computer, or some other communication component. Processing circuitry 303 exchanges user communications with user communication devices 305. Processing circuitry 303 exchanges the user communications with antennas 301-302. In this example, antenna 301 exchanges wireless signals with base station 101, and antenna 302 exchanges wireless communication signals with base station 103. Antennas 301-302 exchange the user communications with base stations 101 and 103 in wireless communication signals that are transported over the air. The wireless communication signals could use CDMA, GSM, WIFI, WIMAX, or some other wireless communication protocol.

Processing circuitry 303 selects which one of antennas 301-302 to use to exchange the user communications with wireless communication system 100. The selection of which antenna to use could be based on signal strength for the wireless communications. For example, if the signal strength between antenna 301 and base station 101 is stronger than the signal strength between antenna 302 and base station 103, then processing circuitry 303 would use antenna 301 having the stronger signal strength. The selection of the antenna to use could be based on time of day for the wireless communications. For example, processing circuitry 303 may use antenna 301 during weekdays and use antenna 302 during weeknights and weekends. The selection of the antenna to use could be based on service degradation. For example, antenna 301 may be used until signal strength between antenna 301 and base station 101 falls below a threshold, and then processing circuitry 303 would use antenna 302. Other measures of service degradation could be used, such as lost packets, error rates, user inputs, or some other metric. The selection of the antenna to use could be based on a control signal from wireless communication system 100. For example, antenna 301 may be used until a control signal is received from system 100 that instructs processing circuitry 303 to use antenna 302. Wireless communication system 100 may send the control signal if base station 101 becomes too heavily loaded. Likewise, antenna 302 may be used until another control signal is received from system 100 instructing processing circuitry 303 to re-use antenna 301. Wireless communication system 100 may send the additional control signal if base station 101 is no longer heavily loaded, or if base station 103 becomes too heavily loaded.

Antennas can be omni-directional or uni-directional. Omni-directional antennas transmit and receive wireless electromagnetic waves in all directions, and uni-directional antennas transmit and receive wireless electromagnetic waves one direction (point-to-point). Omni-directional antennas are convenient for the user because there is no need to point the antenna at the base station, so they can communicate with any base station in range without directional orientation. Directional antennas are less convenient because they must be pointed at their assigned base station, however, uni-directional antennas often have a greater range than omni-directional antennas.

In this example, antenna 301 is omni-directional and antenna 302 is uni-directional. Thus, omni-directional antenna 301 is convenient for the user because it does not need to be pointed at any base station, but antenna 301 also has a restricted range and can only communicate with the closest base station 101. Uni-directional antenna 302 is less convenient because it must be pointed at base station 103, but antenna 302 has greater range and could potentially communicate with either base station 102 or 103.

Figure 4:
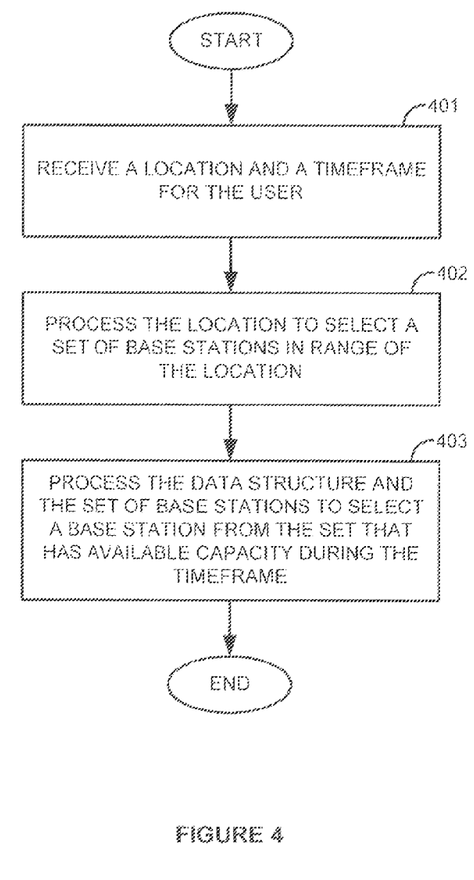
FIG. 4 illustrates a process to assign antennas to base stations in an example of the invention.

FIG. 4 illustrates a process for processing system 106 to assign antenna 302 to base station 103 in an example of the invention. The reference numbers from FIG. 4 are indicated parenthetically below. In this example, antenna 301 is omni-directional and communicates with the closest base station 101. In this example, antenna 302 is uni-directional with significant range, so antenna 302 could potentially communicate with any one of multiple base stations. Wireless communication system 100 provides user communication interface 310 to the user, where the user communication interface 310 selects between antenna 301 and antenna 302 for the exchange of the wireless communications. The process below selects the proper base station for uni-directional antenna 302.

Processing system 106 receives a location and a communication timeframe for the user (401) at user site 300. The location could be a geographic coordinate, street address, geographic code, or some other geographic indicator. The communication timeframe is selected by the user based on when they most need wireless communications. In this example, the user selects an evening timeframe. The evening timeframe could include 7 P.M. to 10 P.M. and exclude 9 A.M. to 4 P.M.

Alternatively, the user could select a daytime timeframe. The daytime timeframe could include 9 A.M. to 4 P.M. and exclude 7 P.M. to 10 P.M. In other examples, the user may select a weekend timeframe that excludes weekdays, or the user may select a weekday timeframe that excludes weekends. The user may select a weekday-evening and weekend timeframe that excludes weekdays. The user may select a weekday timeframe that excludes weekday-evenings and weekends. Other timeframes could be selected. For example, the user may select an overnight timeframe.

Processing system 106 processes the location to select a set of the base stations that can exchange wireless communications with antenna 302 (402). The selection is based on which base stations are in range of the location with the closest base station 101 being reserved for the omni-directional antenna 301. In this example, base stations 102-103 are in range of antenna 302 and are not reserved for antenna 301, but base station 104 is not in range of antenna 302. Thus, base stations 102-103 are in the set.

Processing system 106 processes data structure 107 and the selected communication timeframe to select one of the base stations from the set that has wireless communication capacity during the communication timeframe (403). In this example, the selected timeframe is evenings. Base station 103 is selected from the set because it has the most available capacity during the selected evening timeframe. (See FIG. 2 from 17:00-22:00 hours for base stations 102-103). Thus, antenna 302 is assigned to selected base station 103, and as a result, antenna 302 is pointed at base station 103.

Figure 5:
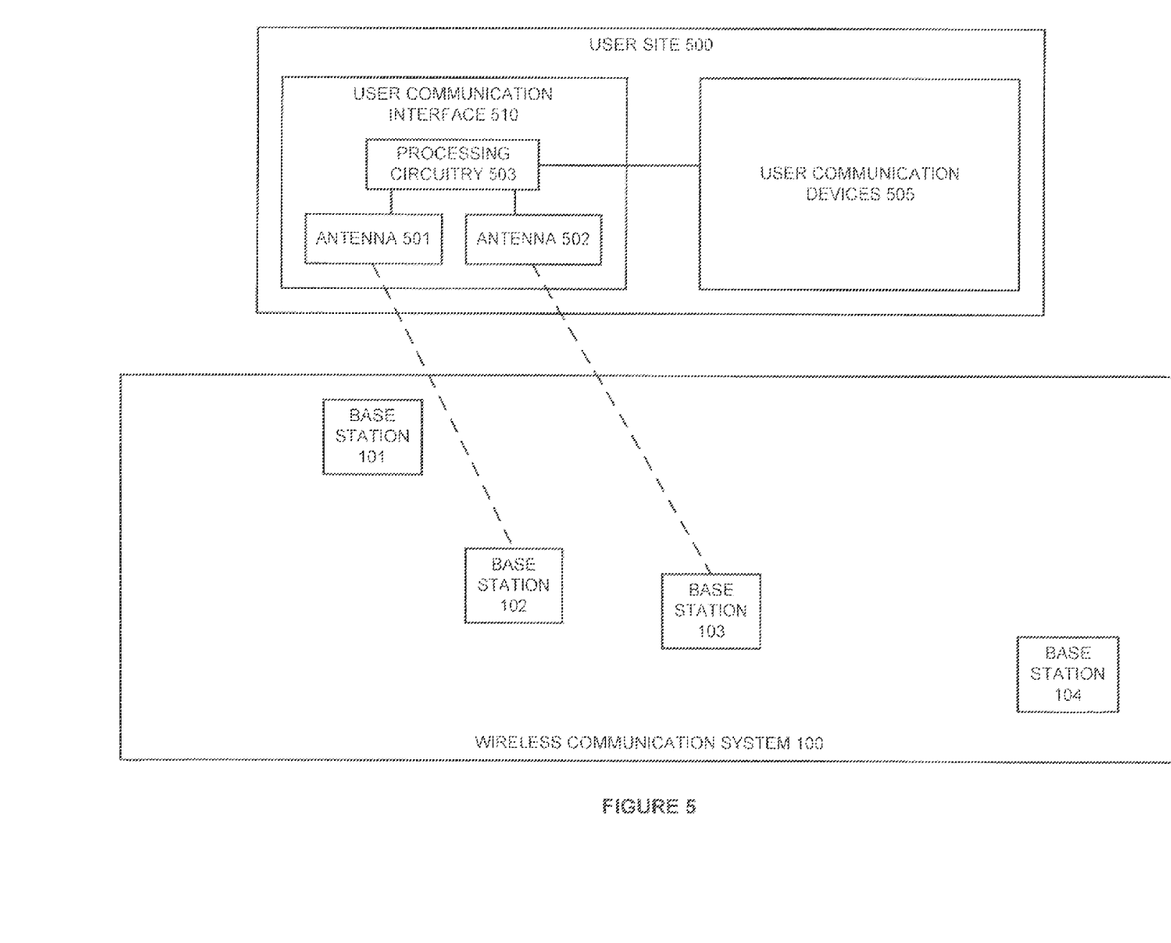
FIG. 5 illustrates the operation of a wireless communication system in an example of the invention.

FIG. 5 illustrates the operation of wireless communication system 100 in an example of the invention. For clarity, base stations 101-104 are shown on FIG. 5, but antennas 111-114 and systems 105-106 are omitted. FIG. 5 also shows user site 500. User site 500 includes user communication devices 505 and user communication interface 510. User communication devices 505 represent telephones, televisions, computers, digital assistants, Internet appliances, game consoles, or some other communication devices. Wireless communication system 100 and user communication interface 510 provide telephony, Internet access, media transfer, or some other communication service to user communication devices 505.

User communication interface 510 includes antennas 501-502 and processing circuitry 503. Processing circuitry 503 could be a modem, transceiver, radio, network card, computer, or some other communication component. Processing circuitry 503 exchanges user communications with user communication devices 505. Processing circuitry 503 exchanges the user communications with antennas 501-502.

In this example, antenna 501 exchanges wireless signals with base station 102, and antenna 502 exchanges wireless communication signals with base station 103. Antennas 501-502 exchange the user communications with base stations 102-103 in wireless communication signals that are transported over the air. The wireless communication signals could use CDMA, GSM, WIFI, WIMAX, and/or some other wireless communication protocol. In this example, antennas 501-502 are uni-directional. Uni-directional antennas 501-502 must be pointed their respective base stations 102-103, but antennas 501-502 have greater range and could potentially communicate with any of base stations 101-103.

Processing circuitry 503 selects which one of antennas 501-502 to use to exchange the user communications with wireless communication system 100. The selection of which antenna to use could be based on signal strength for the wireless communications. For example, if the signal strength between antenna 501 and base station 102 is stronger than the signal strength between antenna 502 and base station 103, then processing circuitry 503 would use antenna 501 having the stronger signal strength. The selection of the antenna to use could be based on time of day for the wireless communications. For example, processing circuitry 503 may use antenna 501 during weekdays and use antenna 502 during weeknights and weekends. The selection of the antenna to use could be based on service degradation. For example, antenna 501 may be used until signal strength between antenna 501 and base station 102 falls below a threshold, and then processing circuitry 503 would use antenna 502. Other measures of service degradation could be used, such as lost packets, error rates, user inputs, or some other metric. The selection of the antenna to use could be based on a control signal from wireless communication system 100. For example, antenna 501 may be used until a control signal is received from system 100 that instructs processing circuitry 503 to use antenna 502. Wireless communication system 100 may send the control signal if base station 102 becomes too heavily loaded. Likewise, antenna 502 may be used until another control signal is received from system 100 instructing processing circuitry 503 to re-use antenna 501. Wireless communication system 100 may send the additional control signal if base station 102 is no longer heavily loaded, or if base station 103 becomes too heavily loaded.

Figure 6:
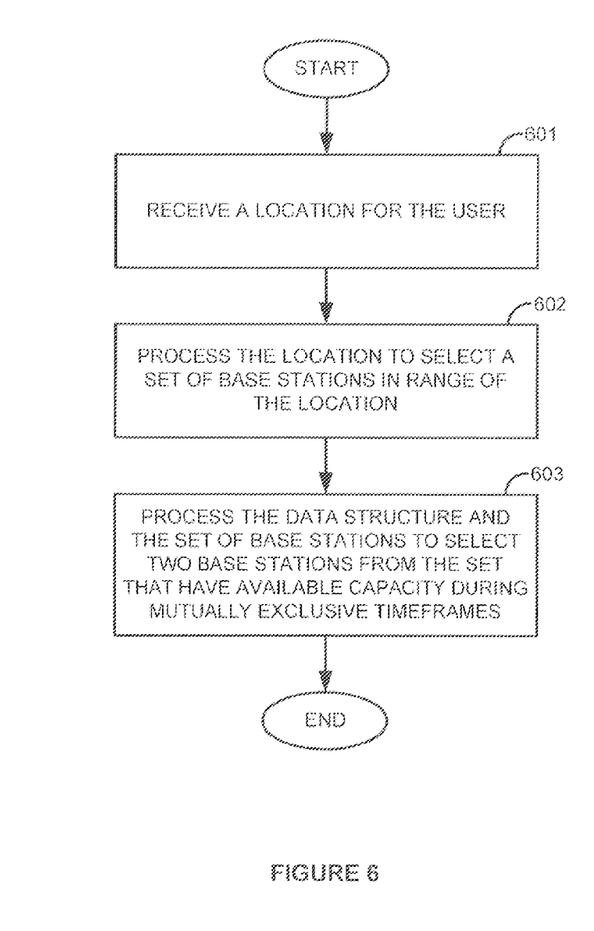
FIG. 6 illustrates a process to assign antennas to base stations in an example of the invention.

FIG. 6 illustrates a process for processing system 106 to assign antenna 501 to base station 102 and to assign antenna 502 to base station 103 in an example of the invention. The reference numbers from FIG. 6 are indicated parenthetically below. In this example, antennas 501-502 are both uni-directional with significant range, so antennas 501-502 can potentially communicate with any one of multiple base stations. Wireless communication system 100 provides user communication interface 510 to the user, where the user communication interface 510 selects between antenna 501 and antenna 502 for the exchange of the wireless communications. The process below selects the proper base stations for uni-directional antennas 501-502.

Processing system 106 receives a location for the user at user site 500 (601). The location could be a geographic coordinate, street address, geographic code, or some other geographic indicator. Processing system 106 processes the location to select a set of the base stations that can exchange wireless communications with antennas 501-502 (602). The selection is based on which base stations are in range of the location. In this example, base stations 101-103 are in range of antennas 501-502, but base station 104 is not in range of antennas 501-502. Thus, base stations 101-103 are in the set.

Processing system 106 processes data structure 107 to select a first base station from the set that has wireless communication capacity during a first timeframe (603). Processing system 106 processes data structure 107 to select a second base station from the set that has wireless communication capacity during a second timeframe (603)—where the first timeframe and the second timeframe are mutually exclusive. The selection of mutually exclusive timeframes provide broad time-based capacity using both antennas 501-502. In this example, the first timeframe is daytime that includes 9 A.M. to 4 P.M. and that excludes 7 P.M. to 10 P.M. The second timeframe is evenings that includes 7 P.M. to 10 P.M. and that excludes 9 A.M. to 4 P.M. Alternatively, the first timeframe could include weekdays and exclude weekends, and the second timeframe could include weekends and exclude weekdays. Other mutually exclusive time frames could be used.

Base station 102 is selected from the set because it has the most available capacity during the first daytime timeframe. (See FIG. 2 from 9:00-16:00 hours for base stations 101-103). Thus, antenna 501 is assigned to selected base station 102, and as a result, antenna 501 is pointed at base station 102. Base station 103 is selected from the set because it has the most available capacity during the second evening timeframe, and the daytime and evening timeframes are mutually exclusive. (See FIG. 2 from 17:00-22:00 hours for base stations 101-103). Thus, antenna 502 is assigned to selected base station 103, and as a result, antenna 502 is pointed at base station 103. Even though base station 101 is closer to user site 500, base stations 102-103 are selected because they are in range and they provide the broadest time-based capacity.

The invention claimed is:

1. A method of operating a wireless communication system having a plurality of base stations, the method comprising:
   maintaining a data structure that indicates wireless communication capacity for the base stations by time;
   receiving a location and a communication timeframe for a user;
   processing the location to select a set of the base stations that can exchange wireless communications with the location;
   processing the data structure and the communication timeframe to select one of the base stations from the set that has the wireless communication capacity during the communication timeframe;
   providing a user communication interface to the user, wherein the user communication interface has a first omni-directional antenna and a second uni-directional antenna, wherein the first omni-directional antenna exchanges the wireless communications with the wireless communication system through a first base station, wherein the second uni-directional antenna exchanges the wireless communications with the wireless communication system through the selected base station, and wherein the user communication interface selects between the first omni-directional antenna and the second uni-directional antenna for the exchange of the wireless communications.

2. The method of claim 1 wherein the selected base station that has the wireless communication capacity during the communication timeframe is a farther distance from the user communication interface than the first base station.

3. The method of claim 1 further comprising, configuring the second uni-directional antenna to point at the selected base station.

4. The method of claim 1 wherein the user communication interface selects between the first omni-directional antenna and the second uni-directional antenna based on signal strength for the wireless communications.

5. The method of claim 1 wherein the user communication interface selects between the first omni-directional antenna and the second uni-directional antenna based on the communication timeframe.

6. The method of claim 1 wherein the user communication interface initially uses the first omni-directional antenna for the wireless communications and the user communication interface uses the second uni-directional antenna for the wireless communications if degradation occurs with the wireless communications over the first antenna.

7. The method of claim 1 wherein the user communication interface initially uses the first omni-directional antenna for the wireless communications and the user communication interface uses the second uni-directional antenna for the wireless communications in response to a control signal from the wireless communication system.

8. The method of claim 1 wherein the communication timeframe is selected by the user.

9. The method of claim 1 wherein the communication timeframe includes a 7 P.M. to 10 P.M. time period and excludes a 9 A.M. to 4 P.M. time period.

10. The method of claim 1 wherein the communication timeframe includes weekends and excludes weekdays.

11. A method of operating a wireless communication system having a plurality of base stations, the method comprising:
  maintaining a data structure that indicates wireless communication capacity for the base stations by time;
  receiving a location for a user;
  processing the location and the data structure to select a first one of the base stations having the wireless communication capacity during a first timeframe and to select a second one of the base stations having the wireless communication capacity during a second timeframe, wherein the first timeframe and the second timeframe are mutually exclusive;
  providing a user communication interface to the user, wherein the user communication interface has a first omni-directional antenna and a second uni-directional antenna, wherein the first omni-directional antenna exchanges the wireless communications with the first base station, wherein the second uni-directional antenna exchanges the wireless communications with the second base station, and wherein the user communication interface selects between the first omni-directional antenna and the second uni-directional antenna for the exchange of the wireless communications.

12. The method of claim 11 wherein the second base station having the wireless communication capacity during the second timeframe is a farther distance from the user communication interface than the first base station.

13. The method of claim 11 further comprising, configuring the first omni-directional antenna to point at the first base station and configuring the second uni-directional antenna to point at the second base station.

14. The method of claim 11 wherein the user communication interface selects between the first omni-directional antenna and the second uni-directional antenna based on signal strength for the wireless communications.

15. The method of claim 11 wherein the user communication interface selects between the first omni-directional antenna and the second uni-directional antenna based on the first timeframe and the second timeframe.

16. The method of claim 11 wherein the user communication interface initially uses the first omni-directional antenna for the wireless communications and the user communication interface uses the second uni-directional antenna for the wireless communications if degradation occurs with the wireless communications over the first omni-directional antenna.

17. The method of claim 11 wherein the user communication interface initially uses the first omni-directional antenna for the wireless communications and the user communication interface uses the second uni-directional antenna for the wireless communications in response to a control signal from the first base station.

18. The method of claim 11 wherein the first timeframe includes a 9 A.M. to 4 P.M. time period and excludes a 7 P.M. to 10 P.M. time period and the second timeframe includes the 7 P.M. to 10 P.M. time period and excludes the 9 A.M. to 4 P.M. time period.

19. The method of claim 11 wherein the first timeframe includes weekdays and excludes weekends and the second timeframe includes the weekends and excludes the weekdays.

20. A method of operating a wireless communication system having a plurality of base stations, the method comprising:
  maintaining a data structure that indicates wireless communication capacity for the base stations by time;
  receiving a location and a communication timeframe for a user;
  processing the location to select a set of the base stations that can exchange wireless communications with the location;
  processing the data structure and the communication timeframe to select one of the base stations from the set that has the wireless communication capacity during the communication timeframe;
  providing a user communication interface to the user, wherein the user communication interface has a first antenna and a second antenna, wherein the first antenna comprises an omni-directional antenna and exchanges the wireless communications with the wireless communication system through a first base station, wherein the second antenna comprises a uni-directional antenna and exchanges the wireless communications with the wireless communication system through the selected base station, wherein the user communication interface selects between the first antenna and the second antenna for the exchange of the wireless communications based on the communication timeframe, and wherein the selected base station that has the wireless communication capacity during the communication timeframe is a farther distance from the user communication interface than the first base station.

* * * * *